United States Patent
Shankar et al.

(10) Patent No.: US 11,646,684 B2
(45) Date of Patent: May 9, 2023

(54) AVERAGE CURRENT CONTROL IN STEPPER MOTOR

(71) Applicant: TEXAS INSTRUMENTS INCORPORATED, Dallas, TX (US)

(72) Inventors: Krishnamurthy Shankar, Bengaluru (IN); Venkata Naresh Kotikelapudi, Bengaluru (IN); Siddhartha Gopal Krishna, Bengaluru (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/933,583

(22) Filed: Jul. 20, 2020

(65) Prior Publication Data

US 2021/0050808 A1 Feb. 18, 2021

Related U.S. Application Data

(60) Provisional application No. 62/886,983, filed on Aug. 15, 2019.

(51) Int. Cl.
*H02P 8/12* (2006.01)
*H02P 8/22* (2006.01)

(52) U.S. Cl.
CPC . *H02P 8/12* (2013.01); *H02P 8/22* (2013.01)

(58) Field of Classification Search
None
See application file for complete search history.

(56) References Cited

U.S. PATENT DOCUMENTS

| | | | | |
|---|---|---|---|---|
| 4,542,329 A * | 9/1985 | Tu Xuan | ............... | G04C 3/143 310/49.24 |
| 5,166,590 A * | 11/1992 | Tu | ............... | G04C 3/143 318/685 |
| 5,247,235 A * | 9/1993 | Tu | ............... | G04C 3/143 318/400.04 |
| 5,504,408 A * | 4/1996 | Tu | ............... | H02P 8/38 318/685 |
| 6,064,174 A | 5/2000 | Sziebert | | |
| 2004/0027084 A1 * | 2/2004 | Berroth | ............... | H02P 6/14 318/400.29 |
| 2011/0188163 A1 | 8/2011 | Ando | | |
| 2013/0314958 A1 | 11/2013 | Kem | | |
| 2014/0028234 A1 | 1/2014 | Lee | | |
| 2015/0028790 A1 * | 1/2015 | Qu | ............... | H02P 8/12 318/696 |
| 2015/0234001 A1 * | 8/2015 | Yamada | ............... | H02P 29/0241 324/762.09 |
| 2015/0236592 A1 | 8/2015 | Inoue | | |

(Continued)

*Primary Examiner* — Said Bouziane
(74) *Attorney, Agent, or Firm* — John R. Pessetto; Frank D. Cimino (57) ABSTRACT

A stepper motor driver includes an H-bridge including first and second outputs. The H-bridge includes a low-side transistor coupled between the first output and a ground. A reference current circuit is configured to produce a reference current. The reference current circuit has a reference output. An averager circuit includes an input and output. The input of the averager circuit is coupled to the first output of the H-bridge. A comparator includes first and second comparator inputs. The first input of the comparator is coupled to the output of the average circuit and the second input of the comparator is coupled to the reference output.

24 Claims, 7 Drawing Sheets

(56) References Cited

U.S. PATENT DOCUMENTS

2016/0043667 A1     2/2016  Aiura
2016/0315571 A1*  10/2016  Hashimoto .............. H02P 8/18
2016/0344327 A1    11/2016  Lopez
2018/0109213 A1*   4/2018  Saw ......................... H02P 8/12

* cited by examiner

AVERAGE CURRENT CONTROL IN STEPPER MOTOR

CROSS-REFERENCE TO RELATED APPLICATION

This application claim priority to U.S. Provisional Application No. 62/886,983, filed Aug. 15, 2019, titled "Average Current Control in Stepper Motors," which is hereby incorporated herein by reference in its entirety.

BACKGROUND

At least one type of stepper motor includes two cons that receive current from a stepper driver. The current to each coil should be sinusoidal with the current to one coil being 90 degrees out of phase with respect to the current to the other coil. The angular position of the stepper motor is a function of the ratio of the magnitude of the currents through the cons (e.g., the arctangent of the ratio of the magnitudes). Inaccuracies in the coil current magnitudes can cause inaccuracies in the rotational position of the motor.

SUMMARY

In at least one example, a stepper motor driver includes an H-bridge including first and second outputs. The H-bridge includes a low-side transistor coupled between the first output and a ground. A reference current circuit is configured to produce a reference current. The reference current circuit has a reference output. An averager circuit includes an input and output. The input of the averager circuit is coupled to the first output of the H-bridge. A comparator includes first and second comparator inputs. The first input of the comparator is coupled to the output of the average circuit and the second input of the comparator is coupled to the reference output.

BRIEF DESCRIPTION OF THE DRAWINGS

For a detailed description of various examples, reference will now be made to the accompanying drawings in which.

DETAILED DESCRIPTION

Figure 1:
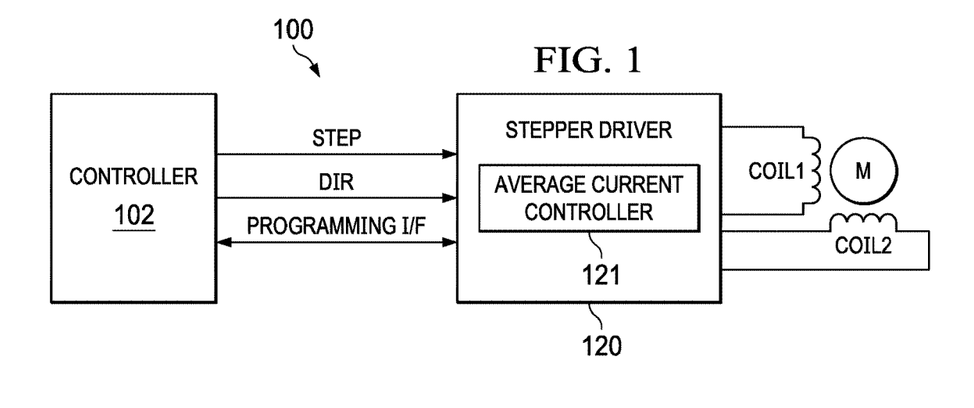
FIG. 1 illustrates a motor control system including an average current controller.

FIG. 1 shows an example of a stepper motor system 100. The example stepper motor system 100 includes a controller 102 coupled to a stepper motor driver 120, which in turn couples to a stepper motor M. The stepper motor M includes Coil 1 and Coil 2, and the stepper driver 120 controls the current through the coils. The current through the coils is approximately sinusoidal and the current through Coil 2 is 90 degrees out of phase with respect to Coil 1.

In one example, the controller 102 includes a processor or other type of digital control circuit. The controller 102 couples to the stepper driver 120 by way of a STEP signal, a direction (DIR) signal, and a programming interface. The programming interface may comprise any suitable interface such as a serial peripheral interconnect (SPI). Each rising edge of the STEP signal causes the stepper driver 120 to advance the motor's position one step, and the DIR signal specifies the direction of the motor change (forward or reverse). The stepper driver 120 includes an average current controller 121 (described below).

Figure 2:
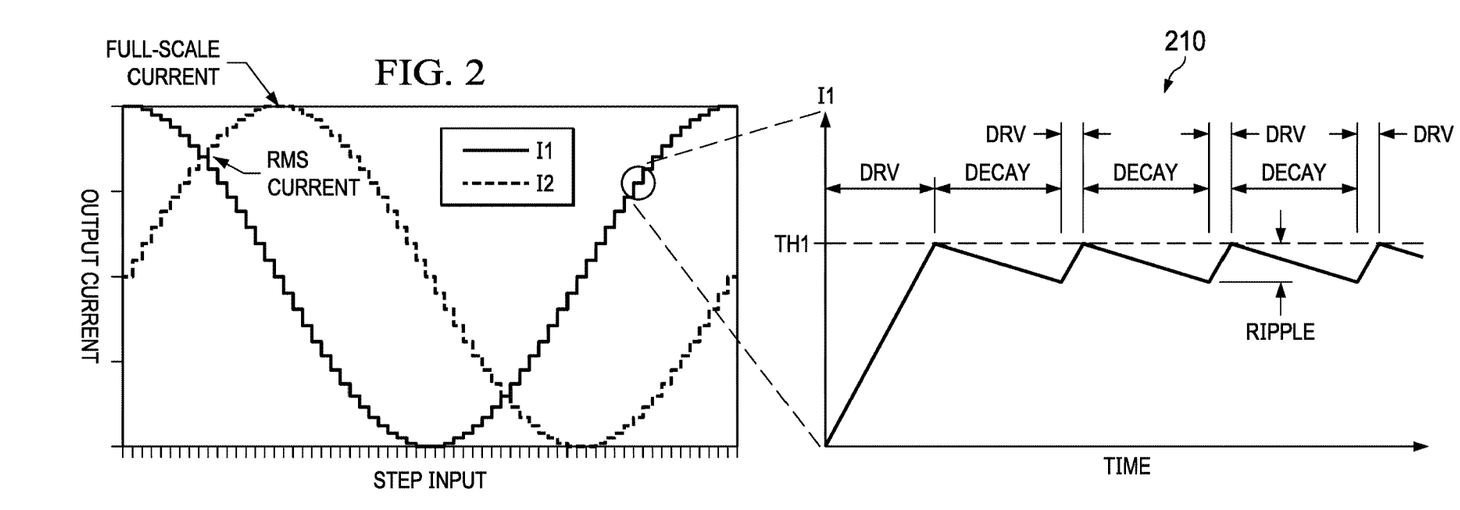
FIG. 2 illustrates current waveforms of the motor control system.

FIG. 2 illustrates examples of approximately sinusoidal currents I1 (through Coil 1) and I2 (through Coil 2). As can be seen, I1 and I2 are 90 degrees out of phase. Each sinusoidal current is formed as a series of discrete steps produced by a digital-to-analog converter within the stepper driver 120. The stepper driver 120 regulates the current in each coil at each step. Current to a motor coil is controlled by an H-bridge (discussed below). Waveform 210 illustrates the coil current of a given step. At each step, a pair of transistors is turned during a drive mode (DRV) and current through the coil increases as shown. When the coil's current reaches an upper threshold (TH1), a decay mode begins, and a different pair of transistors within the H-bridge is turned on. As a result, the coil's current decreases. At each step, the p H-bridge is controlled between alternating drive and decay modes to maintain the peak coil current at a desired level.

The average coil current at a given step is lower than the peak coil current. The torque in the motor, however, is a function of the average current, not peak current. By controlling the peak current of each coil, a torque imbalance may occur across the two coils, Coil 1 and Coil2. Further, regulating coil current based on the coil's peak current suffers from delay in the control path. A driver to turn and off the transistors of the H-bridge experiences a delay. A comparator used to compare the peak coil current to a reference value has a delay. The ripple (shown in FIG. 2 as the difference between the upper and lower coil current values for a given step) due to the delay is a function of the supply voltage to the stepper motor system and the inductance of the motor, which can vary from motor to motor. Ripple is also a function of the off time for the driver during the decay mode.

Figure 3:
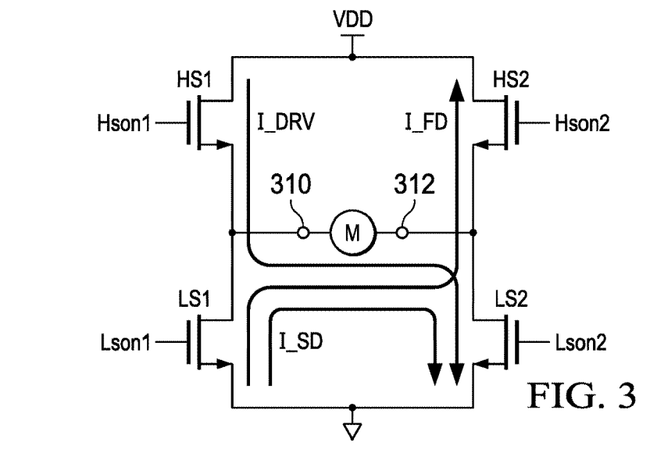
FIG. 3 shows an example of an H-bridge.

FIG. 3 shows an example of an H-bridge. The example H-bridge includes high side (HS) transistors HS1 and HS2 and low side (LS) transistors LS1 and LS2. The transistors in this example comprise n-type metal oxide semiconductor field effect transistors (NMOS) but can be implemented as different types of transistors as desired. The drains of HS1 and HS2 are coupled together and to a supply voltage rail, VDD. The sources of LS1 and LS2 are coupled together and to ground. The source of HS1 is coupled to the drain of LS1 and provides a first H-bridge output 310. The source of HS2 is coupled to the drain of LS2 and provides a second H-bridge output 312. A coil of the motor M is connected to outputs 310 and 312. The other motor coil is connected to a separate H-bridge.

Each of the transistors has a control input (gate) and can be independently controlled. The stepper motor drive 120 can control the transistors of the H-bridge to implement three modes of operation—the drive mode noted above as well as two different decay modes. The two decay modes include a fast decay (FD) mode and a slow decay (SD) mode. During the drive mode, HS1 and LS2 are turned on and HS2 and LS1 are turned off thereby resulting current I_DRV flowing through HS1, motor M, and LS1. During the FD mode, HS2 and LS1 are turned on and HS1 and LS2 are turned off thereby resulting in current I_FD flowing through LS1, motor M, and HS2. During the SD mode, LS1 and LS2 are turned on and HS1 and HS2 are turned off thereby resulting in current I_SD flowing through LS1, motor M, and LS2. As such, coil current flows through LS2 only during the drive and SD modes. During the FD mode, the coil current does not flow through LS2.

Figure 4:
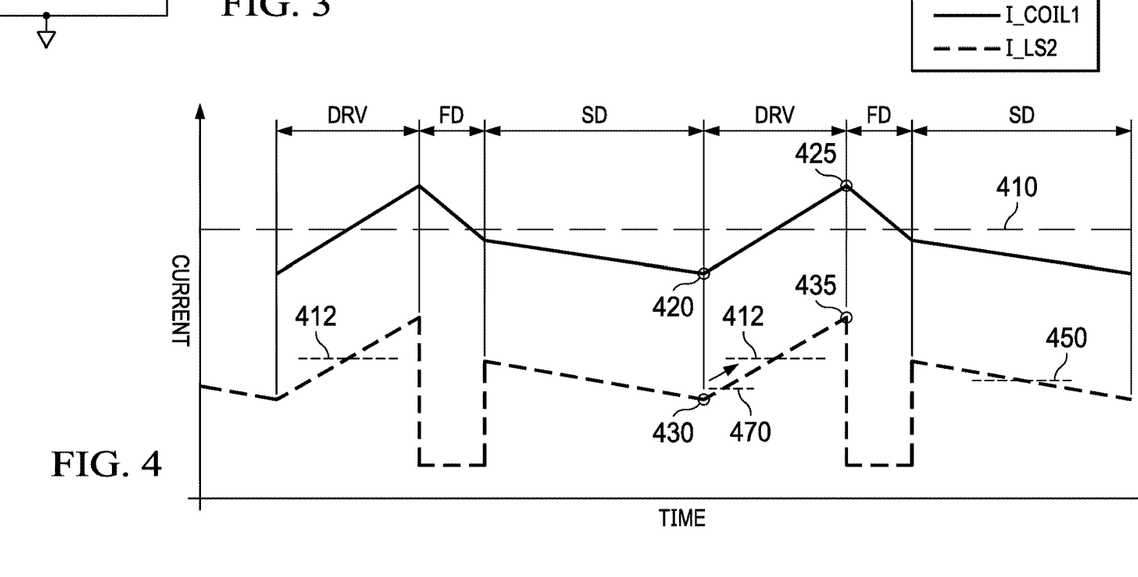
FIG. 4 illustrates example waveforms of motor coil current a current through one of the transistors of the H-bridge.

FIG. 4 shows example waveforms for the coil current, I_COIL1 and the drain current through LS2 (labeled as I_LS2). During the drive mode, the coil current increases. During the FD and SD modes, the coil current decreases with the decay rate being greater during the FD mode than during the SD mode. The I_LS2 current is equal to coil current, I_COIL1, during the DRV and SD modes, and, due to LS2 being off, is zero during the FD mode.

In accordance with disclosed examples, the stepper driver 120 determines the average coil current and controls the transistors of the H-bridge to regulate the average coil current. The average of I_COIL1 is represented by dashed line 410. The average coil current level 410 is halfway between the minimum value 420 and the peak value 425. For the I_LS2 waveform, within each drive mode operation of the H-bridge, the mid-value 412 between the minimum value 430 (which is the same value as 420) and the peak value 435 (the same as 425) is represented by dashed line 412, and dashed line 412 also represents the average value of the coil current. Thus, in accordance with an example, the stepper driver determines the average value of drain current through LS2 (I_LS2) during only the drive mode and uses the average value in the control of the H-bridge to cause the coil current to be regulated to a desired average value.

Figure 5:
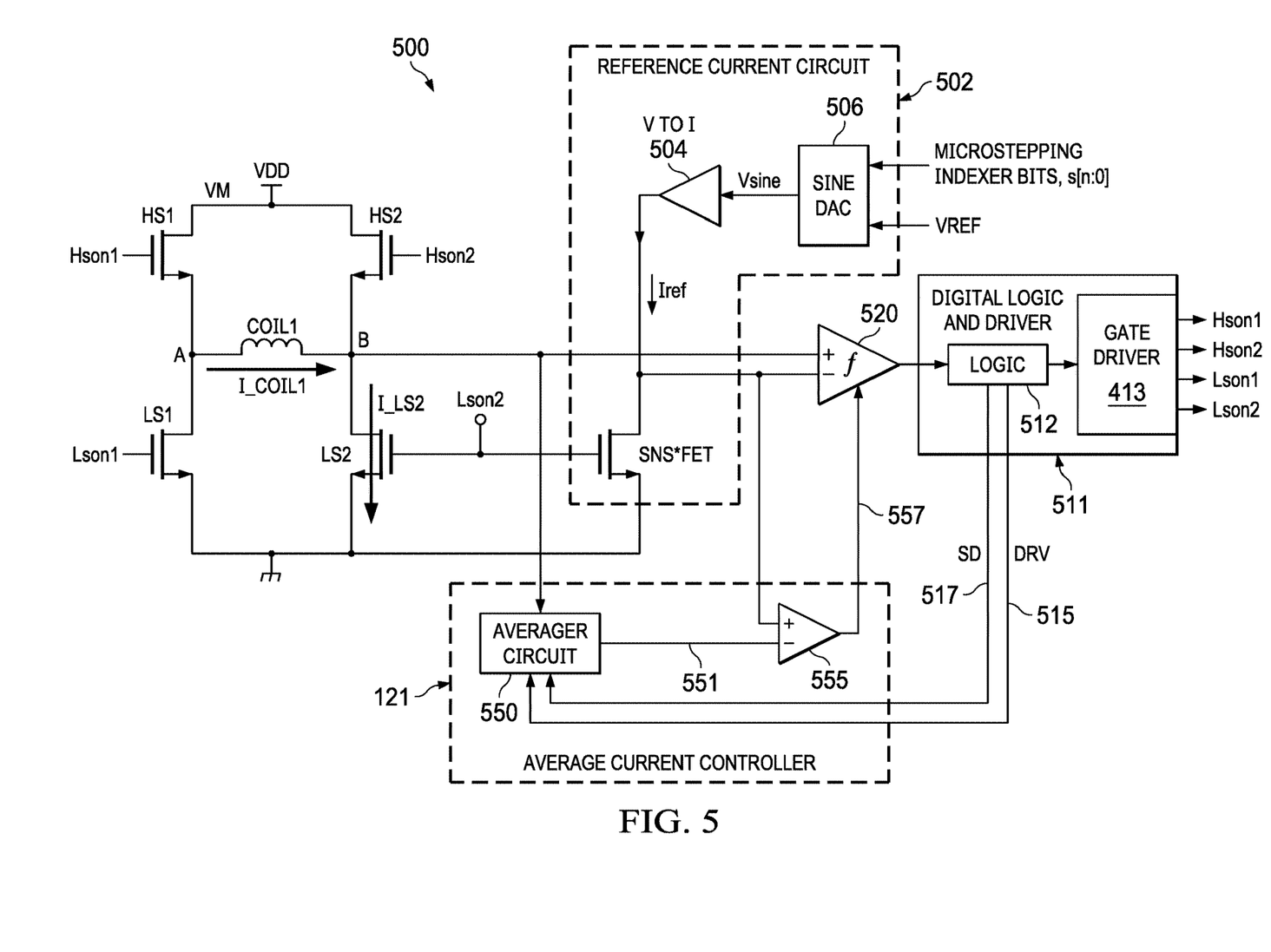
FIG. 5 shows an example of a stepper driver usable in the motor control system of FIG. 1.

FIG. 5 illustrates how the average value of I_LS2 is determined and used to control the coil current. FIG. 5 shows an example of a stepper driver 500 that can be used to implement stepper driver 120 of FIG. 1. The stepper driver 500 includes an H-bridge comprising transistors HS1, HS2, LS1, and LS2. Coil 1 is shown in this schematic, but the coil itself is generally not a component of the semiconductor die containing the other components shown for the stepper driver 500. In addition to the H-bridge, the stepper driver 500 includes a reference current circuit 502, a comparator 520, a digital logic and driver 511, and the average current controller 121.

The reference current circuit 502 includes a voltage-to-current (Vtol) converter 214, a sine digital-to-analog converter (DAC) 506, and a sense transistor (SNS FET), which is an NMOS transistor in this example. As shown in the example of FIG. 5 (and as explained above regarding FIG. 3), the drains of HS1 and HS2 are coupled together at a supply voltage rail (VDD), and the sources of LS1 and LS2 are coupled together at the ground node. The source of HS1 is connected to the drain of LS1 at a node A. Similarly, the source of HS2 is connected to the drain of LS2 at a node B. Coil 1 of the motor can be coupled between nodes A and B. A separate H-bridge and sense FET is provided for the other coil (Coil 2).

The digital logic and driver 211 include logic 512 coupled to a gate driver 413. The gate driver 413 asserts gate signals Hson1, Hson2, Lson1, and Lson2 for the gates of transistors HS1, HS2, LS1, and LS2, respectively. The comparator 520 includes a positive (+) input, a negative (−) input, and output. The output of comparator 520 is coupled to the digital logic and driver 211. The comparator's positive input is coupled to node B which also represents the drain-to-source voltage of transistor LS2. The gate of transistor LS2 is connected to the gate of the SNS FET, and the drain of the SNS FET is coupled to the negative input of comparator 520. The source of the SNS FET is connected to ground.

The sine DAC 506 includes one input that receives microstepping indexer bits (s[n:0]) and another input that receives a reference voltage VREF. The microstepping indexer bits represent control signals for switches internal to the sine DAC 506. The microstepping indexer bits are generated based on a DAC code, and the sine DAC converts each DAC code to an analog output voltage (Vsine), which is then converted to an analog reference current Iref by Vtol 504. The transfer function of the sine DAC is sinusoidal meaning that as the DAC codes are increased or decreased linearly, Vsine varies sinusoidally. For example, FIG. 2 shows the progression of the analog current from Vtol 504 as the DAC code is increased linearly and then decreased linearly.

The output of the Vtol converter 504 is coupled to the drain of the SNS FET and to the negative input of the comparator 520. The reference current (Iref) output by Vtol 504 flows through the SNS FET and produces a voltage on the drain of the SNS FET and thus also on the negative input of comparator. The voltage is a function of the magnitude of Iref. A voltage is created across LS2 (node B) that is a function of I_LS2 (drain current through low side transistor, LS2). Comparator 520 produces an output comparator signal that indicates whether the drain-to-source voltage of LS2 (which is a function of I_LS2) is smaller or larger than the drain-to-source voltage of SNS FET (which is a function of Iref). In other words, comparator 520 determines whether I_LS2 is larger or smaller than Iref. Logic 512 receives and responds to the comparator's output signal to control the timing of the transistors within the H-bridge and enter the decay mode for a fixed time period.

The average current controller 121 includes an average circuit 550 and an offset compensation amplifier 555. The input of the averager circuit 550 is coupled to the drain (node B) of LS2 and the output of average circuit 550 is coupled to the negative input of the offset compensation amplifier 555. The positive input of the offset compensation amplifier 555 is coupled the drain of SNS FET. The averager circuit 550 determines the average of the drain-to-source voltage of LS2 in DRV mode. The average circuit 550 generates an averaging control signal 551 that indicates the average of LS2's drain-to-source voltage in DRV mode (which is a function of I_LS2). Offset compensation amplifier 555 compares the averaging control signal 551 to the drain-to-source voltage of SNS FET (Iref) and produces an error control signal 557, which indicates whether the average of the I_LS2 current (i.e., the drain current through LS2) is smaller or larger than Iref.

The error control signal 557 is provided to a control input of comparator 520 and causes the comparator 520 to adjusts an input offset. The input offset of comparator 520 is the minimum voltage value for which the positive input is determined to be larger than the negative input. For example, if the offset is 1 mv, the positive input must be at least 1 mv larger than the negative input for the output voltage from comparator 520 to be at a high logic level. The input offset of comparator 520 is adjustable and is adjustable based on the error control signal 557 from offset compensation amplifier 555. By adjusting the input offset of comparator 520, the control loop formed by comparing I_LS2 to Iref and used to control the peak coil current is adjusted to cause the coil current to achieve an average value equal to Iref. If the average of I_LS2 is less than Iref (i.e., the average coil current is too low), the error control signal 557 causes comparator 520 to decrease its input offset, which will result in the output of comparator 520 becoming logic high for peak values of the I_LS2 current. Conversely, if the average of I_LS2 is greater than Iref, the error control signal 557 causes comparator 520 to increase its input offset, which will require I_LS2 peak current to be smaller before the output of comparator 520 becomes logic high.

The example of FIG. 5 illustrates that the logic 512 of the digital logic and driver 511 outputs two control signal—DRV 515 and SD 517. In some examples, logic 512 outputs DRV 515 but not SD 517. DRV 515 is a control signal that indicates (e.g., is high) when the H-bridge is being operated in the drive mode. SD 517 is a control that indicates (e.g., is high) when the H-bridge is being operated in the SD mode. The control signals DRV 515 and SD 517 are provided to control inputs of the averager circuit 550.

Figure 6:
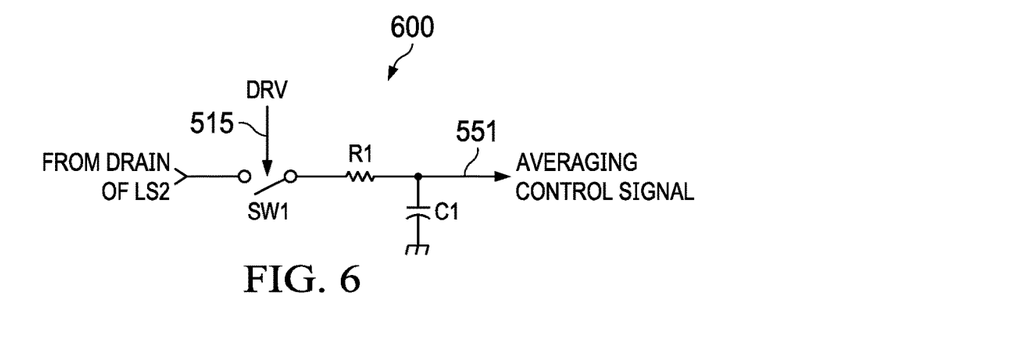
FIG. 6 shows an example of averager circuit for use in the stepper driver.
Figure 7:
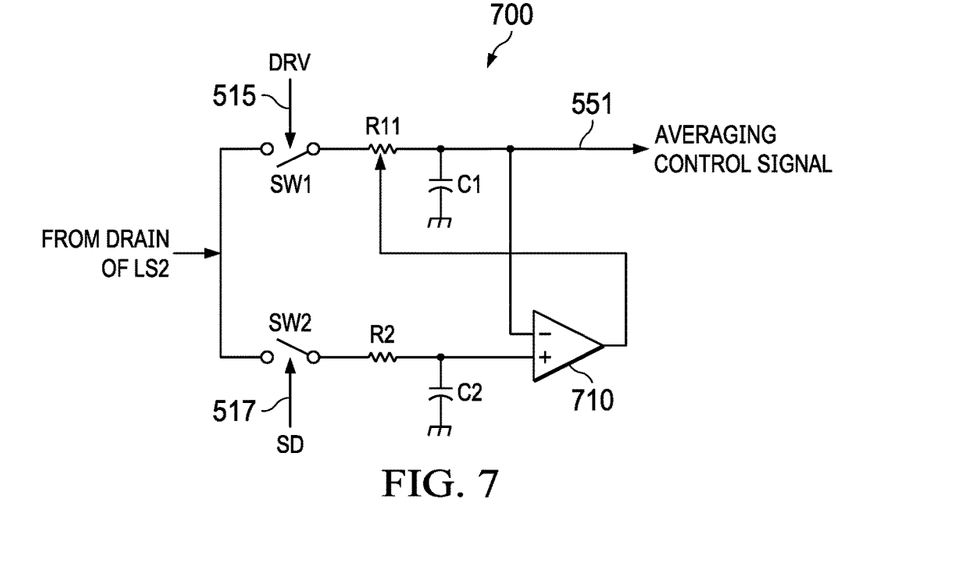
FIG. 7 shows another example of averager circuit for use in the stepper driver.

FIGS. 6 and 7 illustrate example implementations of an averager circuit that can be used to implement averager circuit 550 of FIG. 5. The example averager circuit 600 of FIG. 6 uses the DRV 515 control signal, while the averager circuit 700 of FIG. 7 uses both the DRV 515 and SD 517 control signals. Referring first to FIG. 6, averager circuit 600 includes switch SW1, resistor R1, and capacitor C1. SW1 connects between the drain of LS2 and one terminal of resistor R1. The other terminal of resistor R1 is coupled to C1 and provides the averaging control signal 551. R1 and C1 form a low-pass filter. The DRV signal 515 controls the on/off state of SW1. When H-bridge is being operated in the drive mode, DRV signal 515 causes SW1 to close thereby causing the low-pass filter comprising R1 and C1 to average the drain-to-source voltage of LS2 as the averaging control signal 551.

The RC time constant of the low-pass filter may be long enough that multiple cycles (i.e., multiple drive mode instantiations for one step) are required for the averager circuit 600 to generate a final value for the averaging control signal 551. The example averager circuit 700 of FIG. 7 implements a mode that expedites the averaging control signal 551 to settling at its final value. The averager circuit 700 includes two low-pass filters, each comprising a resistor coupled to a capacitor, and each averaging the drain-to-source voltage of LS2. The averager circuit 700 also includes a comparator 710. One low-pass filter includes SW1 and C1, as well as a resistor R11. R1 in FIG. 6 has a fixed resistance value, but R11 in FIG. 7 has an adjustable resistance value based on the output signal from comparator 710. The other low-pass filter includes switch SW2, resistor R2, and capacitor C2. R2 is coupled between SW2 and C2. The connection between R11 and C1 is coupled to negative input of comparator 710 and the connection between R2 and C2 is coupled to positive input of comparator 710. Switch SW1 is closed when the H-bridge is in the drive mode and switch SW2 is closed when the H-bridge is in the SD mode. Comparator 710 compares the average of LS2's drain-to-source voltage being iteratively produced during the drive mode with the average of LS2's drain-to-source voltage being iteratively produced during the SD mode. The time constant of R2 and C2 is smaller than the time constant of R1 and C1 (of FIG. 6) and thus average of LS2's drain-to-source voltage produced during the SD mode settles more quickly than the average LS2's drain-to-source voltage being iteratively produced during the drive mode. Referring briefly to FIG. 4, the average of LS2's drain-to-source voltage during the SD mode is shown as dashed line 450. Dashed lines 412 and 450 indicate the average values of the LS2 drain-to-source voltage, but the LS2 drain-to-source voltage takes a finite amount of time to settle at the values of 412 and 450. Dashed line 470 shows an example level of the averaging control signal 551 as the low-pass filter begins to settle to its final value of 412. The comparator 710 determines that level 470 is less than 450 (which the low-pass filter of R2 and C2 settles at very quickly). In response, the output signal from comparator 710 causes R11 to change (e.g., decrease) its resistance thereby decreasing the RC time constant of the filter applied the LS2 drain-to-source voltage during the drive-mode and thus causing the low-pass filter of R11 and C1 to begin to settle much faster than would otherwise have been the case. Once the averaging control signal 551 exceeds the level of 450 (LS2 drain-to-source voltage during SD mode), the comparator 710 causes R11 to increase its resistance thereby increasing the RC time constant as the averaging control signal 551 begins to become close to its final value of 412. Having a higher RC time constant of averaging control circuit (>current ripple frequency) helps to reduce or avoid ripple and provide an average value of current for offset compensation.

Figure 8:
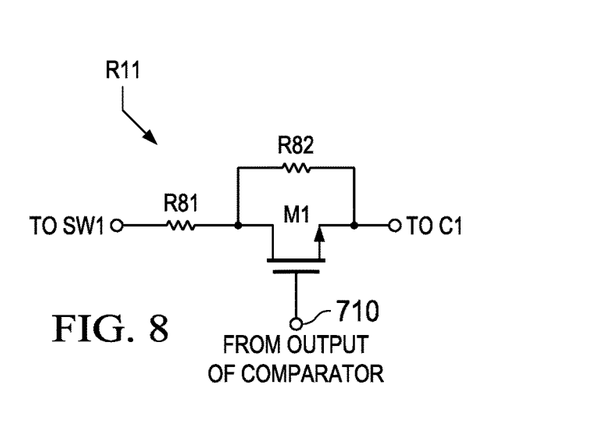
FIG. 8 shows an example variable resistor usable in the averager circuit of FIG. 7.

FIG. 8 shows an example implementation of R11. As shown, R11 comprises fixed resistors R81 and R82, and transistor M11 (e.g., an NMOS device). One terminal of R81 is connected to the drain of M1. The other terminal of R81 is connected to SW1. The source of M1 is connected to C1. R82 is connected across M11 (between the drain and source) The gate of M1 is coupled to the output of comparator 710. Comparator 710 thus controls the gate voltage of M1. By controlling the gate-to-source voltage of M1 and operating M1 in the linear region, M1's drain-to-source resistance is adjustable. Thus, the effective resistance across R11 is adjustable based on the output signal from comparator 710. If M1 is off, the effective resistance is the sum of the resistance of R81 and R82. If M1 is on, the effective resistance is the sum of the resistance of R81 and the on-resistance of M1.

Figure 9:
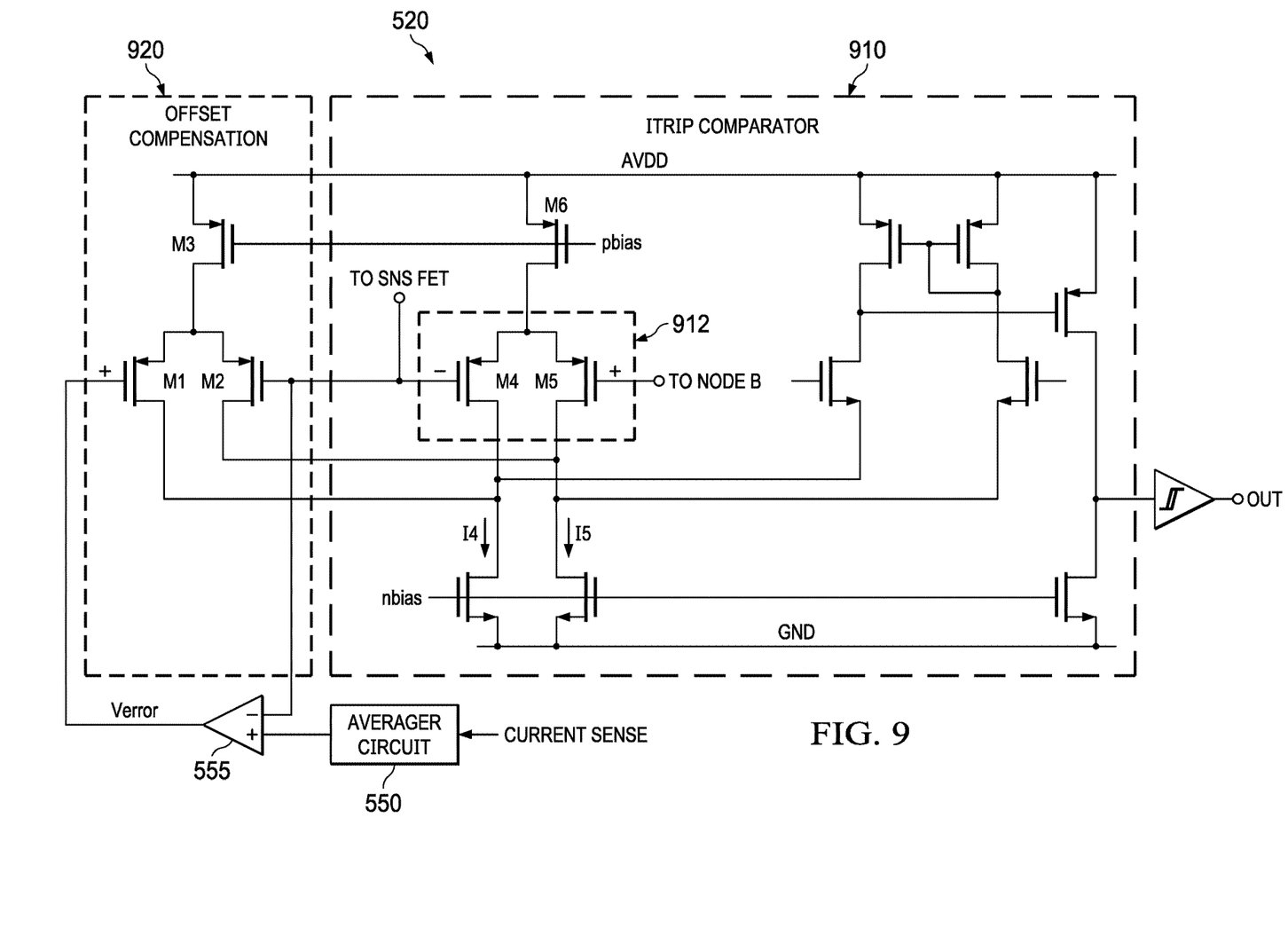
FIG. 9 illustrates how a comparator's input offset can be adjusted.

FIG. 9 shows an example of comparator 520 with input offset control. The comparator 520 in the example of FIG. 9 includes an offset compensation circuit 920 coupled to an Itrip comparator stage 940. The Itrip stage includes a current source device M6 and a differential transistor pair 912 (comprising transistors M4 and M5). The reference current (Iref) (FIG. 5) produces a voltage that is provided to the gate of M4 within differential transistor pair 912, and the gate of M5 of the differential transistor pair is coupled to node B of the H-bridge. The bias current from M6 splits between M4 and M5 based on the relative sizes of the gate-to-source voltages of M4 and M5.

The offset compensation circuit 920 includes a current source device M3 and a transistor pair M1 and M2. The gate of M2 is also coupled to SNS FET as is the gate of M4. The gate of M1 is coupled to the output of offset compensation amplifier 555, as shown. The gate of M3 (and M6) is biased at PBIAS and generates a current that splits between M1 and M2 and into the Itrip comparator 910. The current from M3 splits between M1 and M2 based on the relative sizes of the gate-to-source voltages of M1 and M2. The current through M1 adds to the current through M4 as current I4. Similarly, the current through M2 adds to the current through M5 as current I5. As such, the input offset of comparator 520 is adjustable my altering the gate voltage of M1 by the offset compensation amplifier.

Figure 10:
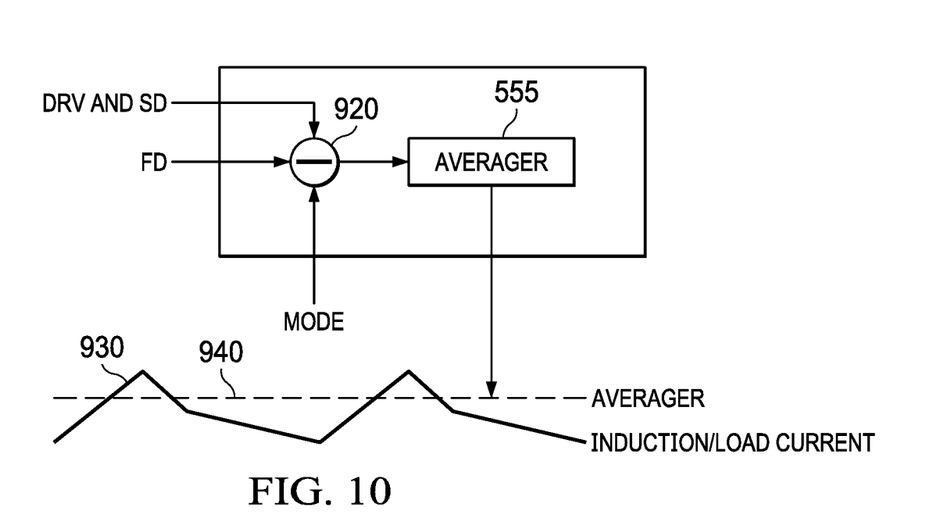
FIG. 10 illustrates another technique for determining an average coil current.

FIG. 10 illustrates an example in which the coil current across all three modes (DRV, SD, and FD) is detected and used to recreate the complete coil current waveform 930. That current waveform is then averaged (940). The current through LS1 flows the opposite direction (source to drain) during FD mode than the current through LS2 during DRV and SD modes (drain to source). As such, the current LS2 during DRV and SD modes is added together and the current LS1 during the FD mode is subtracted by subtractor 1020. A sense FET can be connected to LS1 (gates connected together and sources connected together) to generate a scaled copy of the current through LS1.

Figure 11:
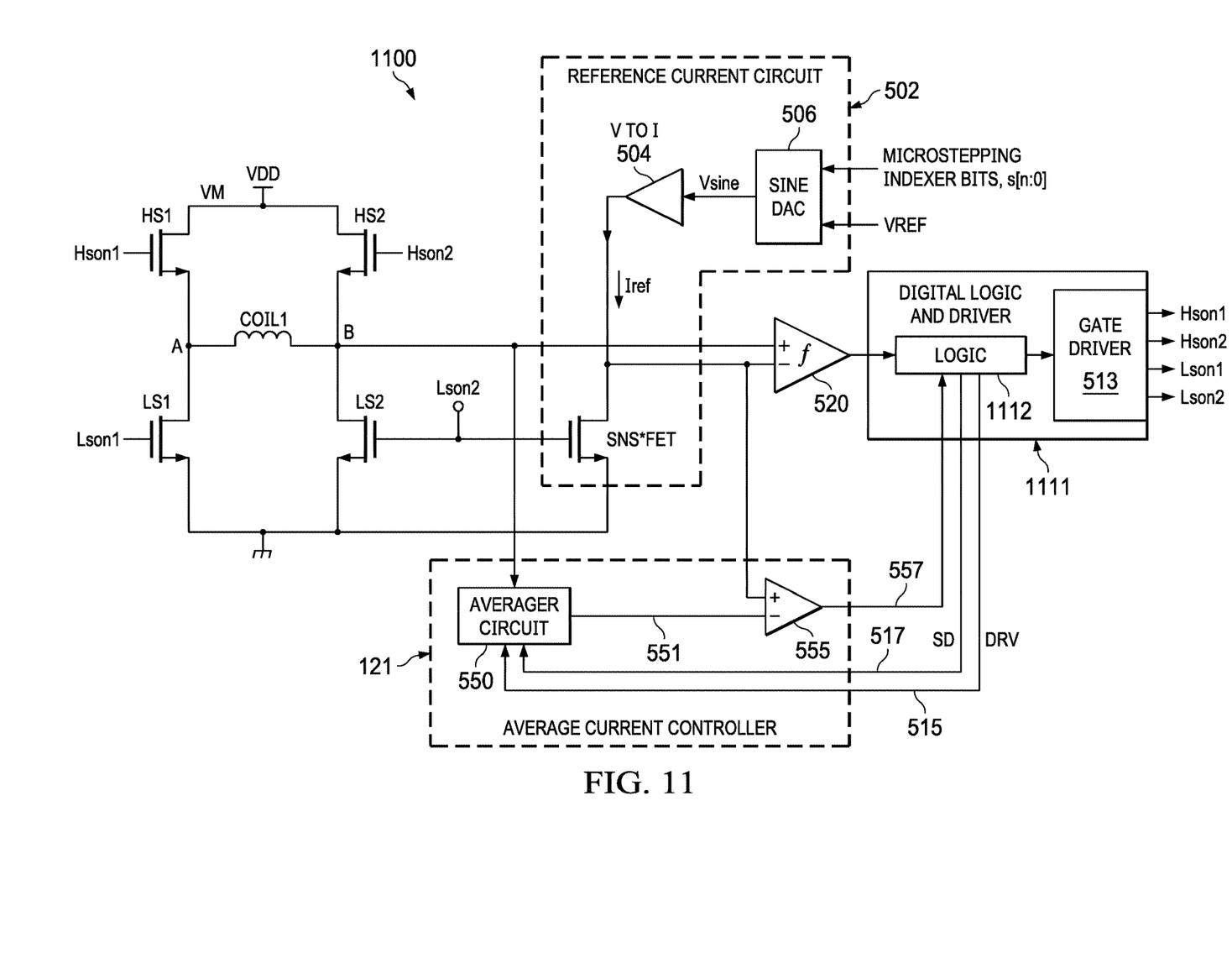
FIG. 11 shows another example of a stepper driver usable in the motor control system of FIG. 1.

FIG. 11 shows an example of stepper driver 1100 that, in many respects, is identical to the stepper driver 500 of FIG. 5. One difference, however, is that the error control signal 557 is coupled to logic 1112 of digital logic and driver 1111. In this implementation, logic 1112 responds to the error control signal 557 by adjusting the timing of the transistors of the H-bridge to thereby regulate the coil current based on a determination of its average value. For example, if the average coil current is too low (lower than IRef), the logic 1112 may increase the time duration of the drive mode relative to the duration of the FD and SD modes—either by increasing the duration of the drive mode or decreasing the duration of the FD and/or SD modes. Alternatively, if the average coil current is too high, the logic 1112 may increase the time duration of the SD mode.

Figure 12:
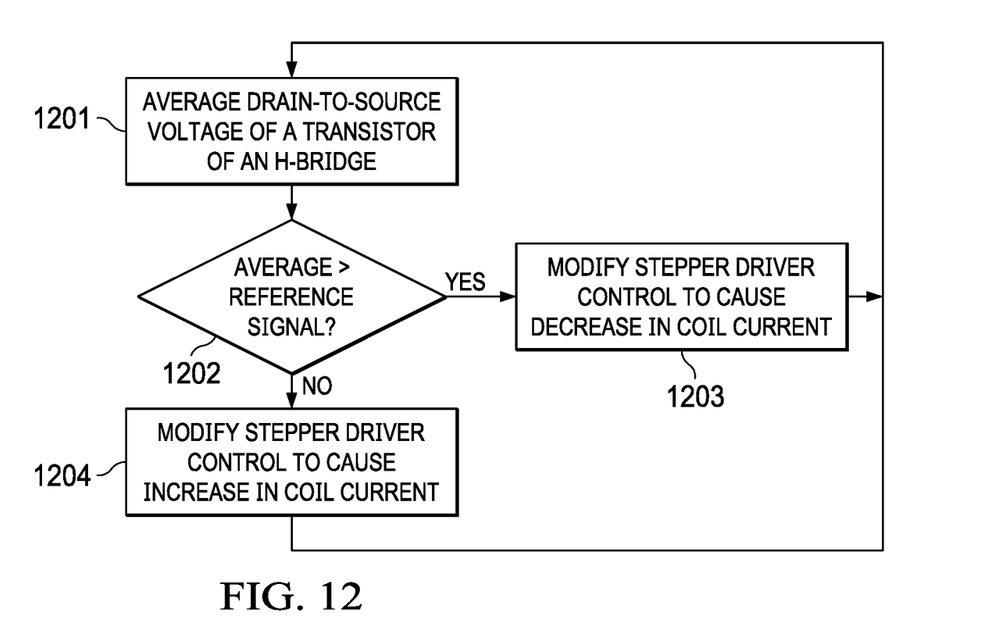
FIG. 12 shows an flow of the logic implemented by the stepper driver.

FIG. 12 shows an example method illustrating the operation of stepper driver 120. At 1201, the method includes averaging the drain-to-source voltage of a transistor within an H-bridge (e.g., a low side transistor such as LS2). At 1202, the method includes comparing the average to a reference signal. If the average is greater than the reference signal, the method includes at 1203 modifying the stepper driver control to cause a decrease in coil current. If the average is less than the reference signal, the method includes at 1204 modifying the stepper driver control to cause an increase in coil current. Various techniques are described above for how the stepper driver can be modified to cause a change in the coil current.

The term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

Modifications are possible in the described embodiments, and other embodiments are possible, within the scope of the claims.

What is claimed is:

1. A stepper motor driver, comprising:
   an H-bridge including first and second outputs, the H-bridge includes a low-side transistor coupled between the first output and a ground;
   a reference current circuit configured to produce a reference current, the reference current circuit having a reference output;
   an averager circuit including an input and an output, the input of the averager circuit is coupled to the first output of the H-bridge; and
   a comparator including first and second comparator inputs, the first input of the comparator is coupled to the output of the average circuit and the second input of the comparator is coupled to the reference output;
   wherein the comparator is a first comparator, and the stepper driver further includes a second comparator having first and second inputs, the first input of the second comparator is coupled to the first output of the H-bridge and the second input of the second comparator is coupled to the reference output;
   wherein an average coil current value is determined;
   wherein the average coil current value is used to control the H-bridge; and
   wherein the control of the H-bridge causes a coil current to be regulated to an average value.

2. The stepper motor driver of claim 1, wherein:
   the first comparator has an output;
   the second comparator has offset adjustment input; and
   the output of the first comparator is coupled to the second comparator's offset adjustment input.

3. The stepper motor driver of claim 1, wherein the first comparator has an output, the second comparator has an output, and the stepper driver further comprises a digital logic circuit having first and second inputs, the first input of the digital logic circuit is coupled to the output of the second comparator and the second input of the digital logic circuit is coupled to the output of the first comparator.

4. A stepper motor driver, comprising:
   an H-bridge including first and second outputs, the H-bridge includes a low-side transistor coupled between the first output and a ground;
   a reference current circuit configured to produce a reference current, the reference current circuit having a reference output;
   an averager circuit including an input and output, the input of the averager circuit is coupled to the first output of the H-bridge; and
   a comparator including first and second comparator inputs, the first input of the comparator is coupled to the output of the average circuit and the second input of the comparator is coupled to the reference output;
   wherein the averager circuit includes a switch and a low-pass filter coupled to the switch;
   wherein an average coil current value is determined;
   wherein the average coil current value is used to control the H-bridge; and
   wherein the control of the H-bridge causes a coil current to be regulated to an average value.

5. A stepper motor driver, comprising:
   an H-bridge including first and second outputs, the H-bridge includes a low-side transistor coupled between the first output and a ground;
   a reference current circuit configured to produce a reference current, the reference current circuit having a reference output;
   an averager circuit including an input and output, the input of the averager circuit is coupled to the first output of the H-bridge; and
   a comparator including first and second comparator inputs, the first input of the comparator is coupled to the output of the average circuit and the second input of the comparator is coupled to the reference output;
   wherein the comparator is a first comparator, and the averager circuit includes:
   a first switch;
   a first low-pass filter coupled to the first switch;
   a second switch;
   a second low-pass filter coupled to the second switch; and a second comparator including first and second inputs, the first input of the second comparator is coupled the first low-pass filter, and the second input of the second comparator is coupled to the second low pass filter;
wherein an average coil current value is determined;
wherein the average coil current value is used to control the H-bridge; and
wherein the control of the H-bridge causes a coil current to be regulated to an average value.

6. The stepper motor driver of claim 5, wherein the first low-pass filter has an adjustable corner frequency.

7. The stepper motor driver of claim 6, wherein the first low-pass filter has a control input, the second comparator has an output, and the output of the second comparator is coupled to the control input of the first-low pass filter.

8. The stepper motor driver of claim 7, further including a digital logic and driver circuit coupled to the h-bridge, and wherein:
the first switch has a control input coupled to the digital logic circuit and driver circuit;
the second switch has a control input coupled to the digital logic circuit and driver circuit.

9. The stepper motor driver of claim 8, wherein the digital logic circuit and driver circuit is configured:
to assert a control signal to the control input of the first switch to close the first switch during a drive mode of the H-bridge; and
to assert a control signal to the control input of the second switch to close the first switch during a slow decay mode of the H-bridge.

10. A stepper motor driver, comprising:
an H-bridge including first and second outputs, the H-bridge includes a low-side transistor coupled between the first output and a ground;
a reference current circuit configured to produce a reference current, the reference current circuit having a reference output;
an averager circuit including an input and output, the input of the averager circuit is coupled to the first output of the H-bridge; and
a comparator including first and second comparator inputs, the first input of the comparator is coupled to the output of the average circuit and the second input of the comparator is coupled to the reference output;
wherein the averager circuit is configured to:
average a signal on the first output of the H-bridge with a first corner frequency responsive to a signal on the output of the average being above a first threshold; and
average the signal on the first output of the H-bridge with a second corner frequency responsive to the signal on the output of the average being below the first threshold;
wherein an average coil current value is determined;
wherein the average coil current value is used to control the H-bridge; and
wherein the control of the H-bridge causes a coil current to be regulated to an average value.

11. A stepper motor driver for a motor, comprising:
an H-bridge including first and second outputs, the H-bridge includes a low-side transistor coupled between the first output and a ground;
a reference current circuit configured to produce a reference current, the reference current circuit having a reference output;
an averager current controller coupled to the low-side transistor and configured to generate an averaging signal responsive to an average current level through the low-side transistor;
the H-bridge configured to control current through a motor coil responsive to the averaging signal;
wherein the averager current controller includes:
an averager circuit having an input and an output, the input of the averager circuit is coupled to the low-side transistor; and
a comparator having first and second inputs, the first input of the comparator nput is coupled to the output of the average circuit and the second input of the comparator is coupled to the reference current circuit;
wherein an average coil current value is determined;
wherein the average coil current value is used to control the H-bridge; and
wherein the control of the H-bridge causes a coil current to be regulated to an average value.

12. A stepper motor driver for a motor, comprising:
an H-bridge including first and second outputs, the H-bridge includes a low-side transistor coupled between the first output and a ground;
a reference current circuit configured to produce a reference current, the reference current circuit having a reference output;
an averager current controller coupled to the low-side transistor and configured to generate an averaging signal responsive to an average current level through the low-side transistor;
the H-bridge configured to control current through a motor coil responsive to the averaging signal;
further comprising a comparator having a control input configured to adjust an offset of the comparator, the averager current controller is configured to provide its averaging signal to the control input of the comparator;
wherein an average coil current value is determined;
wherein the average coil current value is used to control the H-bridge; and
wherein the control of the H-bridge causes a coil current to be regulated to an average value.

13. A stepper motor driver for a motor, comprising:
an H-bridge including first and second outputs, the H-bridge includes a low-side transistor coupled between the first output and a ground;
a reference current circuit configured to produce a reference current, the reference current circuit having a reference output;
an averager current controller coupled to the low-side transistor and configured to generate an averaging signal responsive to an average current level through the low-side transistor;
the H-bridge configured to control current through a motor coil responsive to the averaging signal;
further comprising:
a comparator including first and second inputs, the first input is coupled to the reference current circuit and the second input is coupled to the low-side transistor; and
a digital logic circuit having first and second inputs, the first input of the digital logic circuit is coupled to the output of the comparator and the second input of the digital logic circuit is coupled to the averager current controller;
wherein an average coil current value is determined;
wherein the average coil current value is used to control the H-bridge; and
wherein the control of the H-bridge causes a coil current to be regulated to an average value.

14. A stepper motor driver for a motor, comprising:
an H-bridge including first and second outputs, the H-bridge includes a low-side transistor coupled between the first output and a ground;
a reference current circuit configured to produce a reference current, the reference current circuit having a reference output;
an averager current controller coupled to the low-side transistor and configured to generate an averaging signal responsive to an average current level through the low-side transistor;
the H-bridge configured to control current through a motor coil responsive to the averaging signal;
wherein the averager current controller includes a low-pass filter having an adjustable corner frequency;
wherein an average coil current value is determined;
wherein the average coil current value is used to control the H-bridge; and
wherein the control of the H-bridge causes a coil current to be regulated to an average value.

15. A method, comprising:
averaging a current through a low-side transistor in an H-bridge to produce an averaging control signal;
comparing the averaging control signal to a reference signal; and
controlling current through a motor coil based on the comparison of the averaging control signal to the reference signal;
wherein averaging the current through the low-side transistor includes adjusting a corner frequency of a low-pass filter;
wherein an average coil current value is determined;
wherein the average coil current value is used to control the H-bridge; and
wherein the control of the H-bridge causes a coil current to be regulated to an average value.

16. A stepper motor driver, comprising:
an averager circuit including an input and output, the input of the averager circuit is configured to be coupled to an output of an H-bridge; and
a comparator including first and second comparator inputs, the first input of the comparator is coupled to the output of the average circuit and the second input of the comparator is configure to be coupled to a reference input;
wherein the comparator is a first comparator, and the stepper driver further includes a second comparator having first and second inputs, the first input of the second comparator is configured to be coupled to the output of the H-bridge and the second input of the second comparator is configured to be coupled to the reference input;
wherein an average coil current value is determined;
wherein the average coil current value is used to control the H-bridge; and
wherein the control of the H-bridge causes a coil current to be regulated to an average value.

17. The stepper motor driver of claim 16, wherein:
the first comparator has an output;
the second comparator has offset adjustment input; and
the output of the first comparator is coupled to the second comparator's offset adjustment input.

18. The stepper motor driver of claim 16, wherein the first comparator has an output, the second comparator has an output, and the stepper driver further comprises a digital logic circuit having first and second inputs, the first input of the digital logic circuit is coupled to the output of the second comparator and the second input of the digital logic circuit is coupled to the output of the first comparator.

19. A stepper motor driver, comprising:
an averager circuit including an input and output, the input of the averager circuit is configured to be coupled to an output of an H-bridge; and
a comparator including first and second comparator inputs, the first input of the comparator is coupled to the output of the averager circuit and the second input of the comparator is configured to be coupled to a reference input;
wherein the averager circuit includes a switch and a low-pass filter coupled to the switch;
wherein an average coil current value is determined;
wherein the average coil current value is used to control the H-bridge; and
wherein the control of the H-bridge causes a coil current to be regulated to an average value.

20. A stepper motor driver, comprising:
an averager circuit including an input and output, the input of the averager circuit is configured to be coupled to an output of an H-bridge; and
a comparator including first and second comparator inputs, the first input of the comparator is coupled to the output of the average circuit and the second input of the comparator is configured to be coupled to a reference input;
wherein the comparator is a first comparator, and the averager circuit includes:
a first switch;
a first low-pass filter coupled to the first switch;
a second switch;
a second low-pass filter coupled to the second switch; and
a second comparator including first and second inputs, the first input of the second comparator is coupled the first low-lass filter, and the second input of the second comparator is coupled to the second low pass filter;
wherein an average coil current value is determined;
wherein the average coil current value is used to control the H-bridge; and
wherein the control of the H-bridge causes a coil current to be regulated to an average value.

21. The stepper motor driver of claim 20, wherein the first low-pass filter has an adjustable corner frequency.

22. The stepper motor driver of claim 21, wherein the first low-pass filter has a control input, the second comparator has an output, and the output of the second comparator is coupled to the control input of the first-low pass filter.

23. The stepper motor driver of claim 22, further including a digital logic and driver circuit coupled to the h-bridge, and wherein:
the first switch has a control input coupled to the digital logic circuit and driver circuit;
the second switch has a control input coupled to the digital logic circuit and driver circuit.

24. The stepper motor driver of claim 23, wherein the digital logic circuit and driver circuit is configured to:
to assert a control signal to the control input of the first switch to close the first switch during a drive mode of the H-bridge; and
to assert a control signal to the control input of the second switch to close the first switch during a slow decay mode of the H-bridge.

* * * * *